(12) United States Patent
Izumi et al.

(10) Patent No.: US 7,615,177 B2
(45) Date of Patent: Nov. 10, 2009

(54) TRIM ARTICLES WITH INVISIBLE TEAR SEAMS AND METHODS OF MAKING THE SAME

(75) Inventors: Masao Izumi, Novi, MI (US); Yukihisa Fujita, Commerce Township, MI (US)

(73) Assignee: CalsonicKansei North America, Inc., Farmington Hills, MI (US)

( * ) Notice: Subject to any disclaimer, the term of this patent is extended or adjusted under 35 U.S.C. 154(b) by 565 days.

(21) Appl. No.: 11/063,503

(22) Filed: Feb. 23, 2005

(65) Prior Publication Data

US 2006/0186649 A1    Aug. 24, 2006

(51) Int. Cl.
*B29C 41/08* (2006.01)
*B29C 41/22* (2006.01)

(52) U.S. Cl. .............. 264/255; 264/DIG. 72; 264/309

(58) Field of Classification Search .......... None
See application file for complete search history.

(56) References Cited

U.S. PATENT DOCUMENTS

| | | |
|---|---|---|
| 5,203,586 A | 4/1993 | Niwa et al. |
| 5,429,784 A | 7/1995 | Iannazzi et al. |
| 5,885,662 A | 3/1999 | Gardner et al. |
| 6,348,172 B1 | 2/2002 | Barnes |
| 6,460,880 B1 | 10/2002 | Gallagher et al. |
| 6,753,057 B1 | 6/2004 | Gardner, Jr. |
| 2002/0043788 A1 | 4/2002 | Gallagher et al. |
| 2003/0071386 A1 | 4/2003 | Lilienthal et al. |
| 2003/0205886 A1 | 11/2003 | Riha |
| 2004/0019175 A1 | 1/2004 | Trossaert et al. |
| 2004/0061262 A1 | 4/2004 | Cowelchuk |
| 2004/0126532 A1 | 7/2004 | Gardner, Jr. |
| 2004/0164531 A1 | 8/2004 | Riha et al. |

FOREIGN PATENT DOCUMENTS

| | | | |
|---|---|---|---|
| DE | 102006025665 | * | 12/2007 |
| JP | 7-52741 | * | 2/1995 |
| JP | 2002-114122 | * | 4/2002 |
| JP | 2003-237516 | * | 8/2003 |

* cited by examiner

*Primary Examiner*—Edmund H. Lee
(74) *Attorney, Agent, or Firm*—Butzel Long

(57) ABSTRACT

A method of forming an invisible frangible tear seam in a multi-layered vehicle trim panel for deployment of an air bag therethrough. The method involves the use of a jig or mask that is configured in the desired shape of the tear seam. The tear seam is produced by providing a first polymeric layer on a trim panel mold surface and then positioning the jig or mask on the first polymeric layer. Next a second polymeric layer is applied to the first polymeric layer using a spray process. After the second polymeric layer has been applied the jig or mask is removed, leaving a foot-print of the jig or mask which defines the tear seam. The resulting bi-layered structure is joined to a support panel using an adhesive foam to form a multi-layered vehicle trim panel.

17 Claims, 8 Drawing Sheets

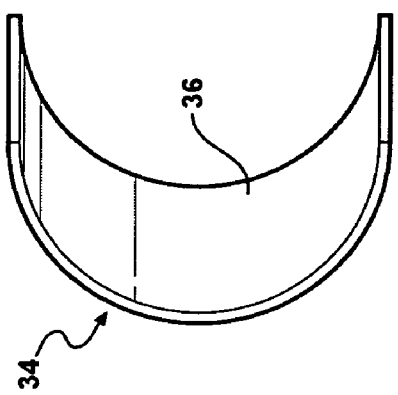
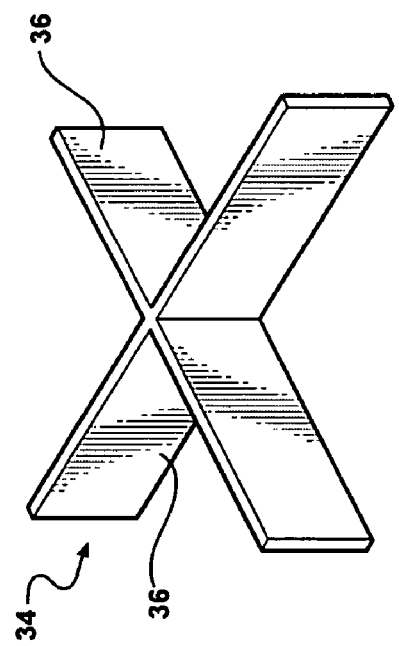
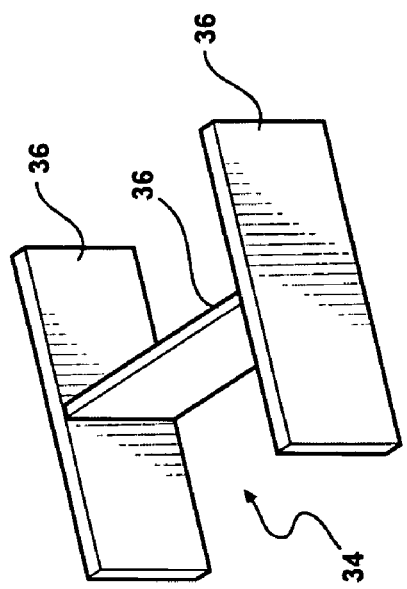
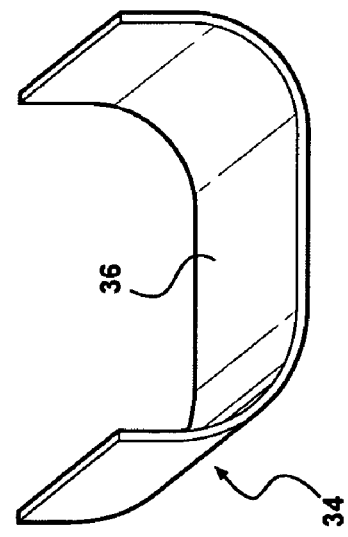
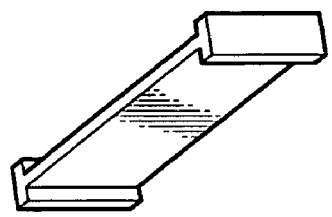

US 7,615,177 B2

TRIM ARTICLES WITH INVISIBLE TEAR SEAMS AND METHODS OF MAKING THE SAME

TECHNICAL FIELD

The present invention relates to interior trim articles containing panel structures which are mountable in a vehicle to form part of the interior of the vehicle and which are provided with concealed tear seams that allow for rupture and deployment of air bags therethrough. The present invention further relates to a process for making interior trim articles having tear seams formed therein.

BACKGROUND ART

Government regulations and consumer demand have resulted the inclusion of air bags, as secondary restraint systems, in virtually all new automobiles being sold today. The use of air bags in conjunction with seat belts has drastically reduced the number of fatalities related to motor vehicle accidents.

Air bag restraint systems are generally concealed from view during normal operation of a vehicle by arranging the air bag restraint systems behind automotive interior trim articles, such as instruments panels, dashboards, and/or door panels.

In order to provide for rapid deployment of air bags during a collision, the interior trim articles behind which air bags are concealed are often formed of a multi-layered structure that includes a rigid substrate having hidden doors formed therein, an outer decorative skin layer, and a soft cellular polyurethane foam layer formed therebetween. The hidden doors of the rigid substrate are configured and arranged in such a manner that the edges of the doors define discernable patterns, such as patterns in the form of H, C, U and X shapes.

During a collision, at impact the gas generating system of the air bag module is actuated. As the gas inflates the air bag it is directed toward and pushes against the backside of the hidden doors and forces the hidden doors to open into the passenger compartment of the vehicle. The emergence of the hidden doors into the passenger compartment creates a passageway which permits deployment of the air bag into the passenger compartment of the vehicle. The deployed air bag protects the occupants of the vehicle from experiencing serious impact injury.

In order to minimize obstruction of the passageway through which the expanding air bag is deployed, the underside of the outer skin can be provided with structurally weakened tear seams. These tear seams often take the form of perforated or channel-like patterns, and are constructed and arranged to substantially correspond to and overlay the pattern (e.g., H-shape) defined by the edges of the hidden doors of the substrate. During deployment of the air bag, the outer skin tears or fractures along the structurally weakened tear seams. Absent the presence of such structurally weakened tear seams in the outer skin, the outer skin may possess sufficient internal strength to resist fracture upon deployment of the air bag. If the skin does not fracture, the entire outer skin can become separated from the underlying rigid substrate and/or the multi-layered structure can become detached from the vehicle frame and imperil the safety of the vehicle occupants.

Different techniques have been proposed for forming multi-layered interior trim panels having outer skins that are provided with structurally weakened, rupturable tear seams. The use of knifes and lasers to cut or score inside portions of cover layers or skins has been used by some manufacturers. These methods require precise control of the depth of the cut and can result in a significant number of rejected parts when there are variations in the depth of the cuts.

Another proposed method for forming invisible tear seams in interior trim panels involves embedding seam-defining structures within the cover layers or skins. The seam-defining structures can be strips of film or pieces of string or twine. One disadvantage with this method is that if the embedded seam-defining structures are not properly positioned they can appear as an unsightly defect on the outer surface of the interior panels.

The present invention provides a method for making interior trim articles having tear seams formed therein which method involves spray forming tear seams in a precise repeatable manner.

DISCLOSURE OF THE INVENTION

According to various features, characteristics and embodiments of the present invention which will become apparent as the description thereof proceeds, the present invention provides a method of forming an outer layer for a multi-layered trim panel for a vehicle with an invisible tear seam formed in the outer layer which method involves:

providing a mold surface that conforms to the shape of a vehicle trim panel;

applying a first layer of polymeric material to at least a portion of the mold surface;

providing a jig or mask that is configured in the shape of a desired tear seam pattern;

positioning the jig or mask onto the first layer of plastic material;

applying a second layer of polymeric material onto the first layer of plastic material; and removing the jig or mask to form a tear seam in the resulting two layered structure which can be used as the outer layer or skin of a multi-layered panel for a vehicle.

The present invention further provides a method of forming a multi-layered trim panel for a vehicle with an invisible tear seam formed in the outer layer which method involves:

providing a mold surface that conforms to the shape of a vehicle trim panel;

forming a bi-layer of a polymeric material on the mold surface;

providing a support substrate; and attaching the bi-layer of polymeric material to the support substrate using an elastomeric foam, the bi-layer of polymeric material being formed by:

i) applying a first layer of polymeric material to at least a portion of the mold surface by a spraying process;

ii) providing a jig or mask that is configured in the shape of a desired tear seam pattern;

iii) positioning the jig or mask onto the first layer of polymeric material;

iv) applying a second layer of polymeric material onto the first layer of polymeric material by a spraying process; and v) removing the jig or mask to form a tear seam in the resulting bi-layer.

The present invention also provides a bi-layered polymeric skin article having a frangible tear seam formed therein which includes:

a first layer of a polymeric material;

a second layer of a polymeric material formed on the first layer of polymeric material to form a bi-layer with an interface between the layers;

at least one channel having a bottom and formed in the second layer of polymeric material so that the bottom of the channel is positioned at the interface between the first and second layers.

The present invention further provides a method of forming a polymeric skin article which involves:

providing a mold surface that is configured to produce a trim panel having cut-out portions;

providing at least one insert that is substantially configured to the shape of a portion of the mold surface that corresponds to one of the cut-out portions of the trim panel;

positioning the at least one insert over the portion of the mold surface that corresponds to the one cut-out portion of the trim panel;

forming a polymeric skin layer by spraying a polymeric material onto the mold surface and edges of the at least one insert exclusive of the center of the at least one insert; and removing the polymeric skin from the mold and trimming out the at least one insert.

BRIEF DESCRIPTION OF DRAWINGS

The present invention will be described with reference to the attached drawings which are given as non-limiting examples only, in which:

FIGS. 11A-11E are drawings of different seam jigs or masks that can be used in accordance with the present invention.

BEST MODE FOR CARRYING OUT THE INVENTION

Figure 1:
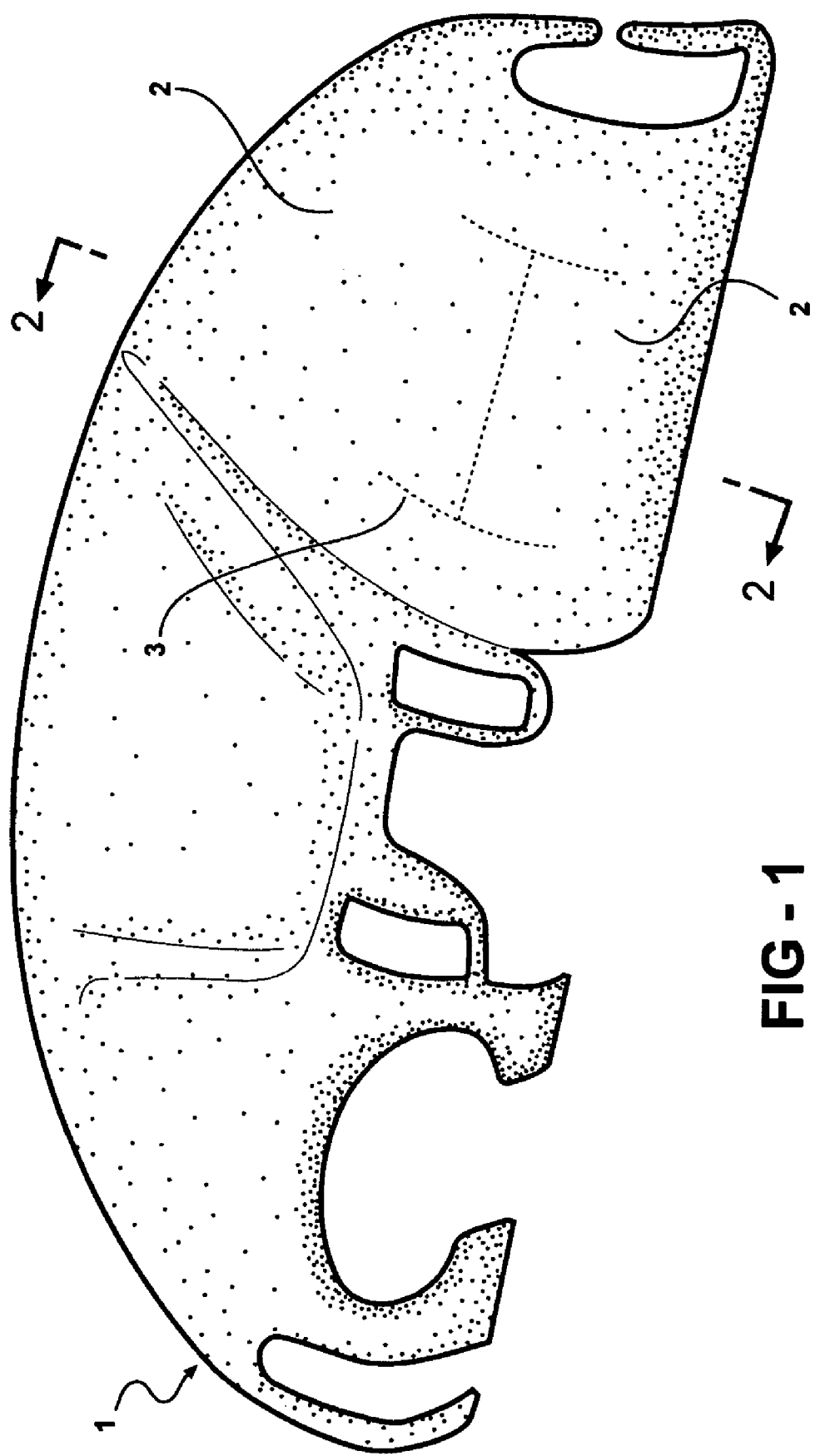
FIG. 1 is a perspective view of an instrument panel of a vehicle constructed in accordance with the present invention.

The present invention is directed to a method of manufacturing interior trim articles for vehicles which are provided with concealed or invisible tear seams that allow for rupture and deployment of air bags therethrough. According to the present invention, tear seams can be formed in any desired configuration, including for example in H-, I- C-, U- and X-shapes. These, and other tear seam shapes are used in conjunction with hidden doors and other structures that are formed or provided in underlying rigid substrates which allow air bags to deploy through doors or panels that open apart, open by pivoting upward or downward, or open in some other fashion.

The present invention is particularly used in conjunction with spray processes that are used to form the outer layer(s) of multi-layered structures in which the outer layer(s) is/are supported on an underlying rigid support with a foam layer provided between the outer layer(s) and the rigid support. The outer layer(s) is/are formed by spraying a curable film-forming material or curable molten thermoplastic material onto a mold surface that is shaped and suitable textured, e.g. grained to provide the resulting outer surface of skin with a desired appearance, such as leather. After the outer surface or skin is formed it is removed from the mold, trimmed as necessary and adhered to the rigid substrate by an adhesive foam such as urethane that provides some degree of padding or cushioning beneath the outer surface layer or skin. Reference herein to outer layer(s) is made because, although a final interior trim panel will only have one exposed outer layer, in some embodiments the layer(s) in which the tear seam is produced may be covered with an addition outer layer such as a layer of paint or pigmented material. In addition, in some embodiments the tear seam is formed from two (first and second) outer layers or from a single outer layer. Accordingly, there can be a single or a plurality of outer layers used in the present invention although there will only be one exposed outer layer.

According to one embodiment of the present invention, the outer layer comprises a first outer layer and a second outer layer. The first outer layer is a relatively thin layer having a thickness of from about 0.2 to 1.0 mm, or preferably from about 0.2 to about 0.6 mm. This first outer layer is applied to the mold surface by a spraying process and has a thickness which will become the thickness of the tear seams. Accordingly, the thickness of the first outer layer can be adjusted as necessary to ensure that the tear seam which will rupture and tear when a given pressure is applied thereto. That is, the first outer layer is thin enough to rupture and tear without any cut, groove, notch, etc. being formed therein.

Once the first outer layer is formed, a seam jig or mask is used to form the desired configuration of the final tear seam. The seam jig or mask includes one or more thin panels that are configured in the shape of an H, I, C, U, X or other desired shape. The jig or mask is placed on the first outer layer in a position which corresponds to where the tear seam is to be formed. Next, a second outer layer is applied to the mold over the first outer layer by a spraying process. The second outer layer strengthens the first outer layer so that the resulting structure can be handled without tearing the first outer layer. The second outer layer can be made from the same or a different material from the first outer layer and can have a thickness of from about 0.4 to about 1.5 mm or larger and preferable from about 0.6 to about 1.0 mm. The combined thickness of the first outer layer and the second outer layer should be sufficient to allow handling and application for the formation of a multi-layered structure or trim panel. A suitable total thickness is from about 0.6 mm to about 1.5 mm and preferable from about 0.8 mm to about 1.4 mm. The second outer layer can have a thickness greater than 1.5 mm and the combined thickness can thus be greater than 1.5 mm; however, such an increase in thickness adds to cost without providing any additional benefit. Whereas the thickness of the second outer layer provides for handling and application for the formation of a multi-layered structure or trim panel (e.g., removal of the outer layer from a mold surface), the thickness of the first outer layer is more important than the thickness of the second outer layer and thus the combined thickness of the first and second outer layers, since the thickness of the first outer layer determines how a tear seam which will rupture and tear when a given pressure is applied thereto.

Since the second outer layer is applied with the seam jig or mask positioned on the first outer layer, removal of the seam jig or mask leaves the foot-print of the seam jig or mask in the second outer layer. The panels of the seam jig or mask are relatively thin with a thickness of from about 0.3 to about 1.0 mm and preferably from about 0.3 mm to about 0.6 mm being suitable for producing a tear seam having a width that will rupture and tear when a given pressure is applied thereto. The panels of the seam jig or mask can be of any suitable height that enables the seam jig or mask to be removed after the second outer layer has been applied and substantially cured or hardened. The seam jib or mask does not remain embedded in the second outer layer. If necessary, a release agent can be applied to the seam jig or mask to ensure that the seam jig or mask can be removed after the second outer layer has been applied and substantially cured or hardened.

After the outer layer or skin (which includes the first and second spray formed outer layers discussed above) is formed, it is removed from the mold, trimmed as necessary and adhered to the rigid substrate by a foam adhesive such as urethane foam which provides some padding or cushioning to the resulting multi-layered structure.

According to one embodiment of the present invention the first outer layer is applied to the entire mold surface. According to an alternative embodiment, the first outer layer need only be applied to the area over which the tear seam is to be formed. However in this alternative process it may be necessary to paint the outer surface of the resulting outer layer to conceal any transition or boundary that may be visible between first and second outer layers.

The present invention further involves the use of plastic mold inserts that are placed over areas of a mold surface upon which spray formed layer portions are otherwise formed and trimmed off and discarded during the fabrication of a multi-layered interior trim panel. The plastic inserts can be formed by vacuum molding a relatively inexpensive material as compared to the cost of the material in the sprayed layer that is otherwise discarded.

In the preparation of a multi-layered interior trim panel using the plastic inserts, the plastic inserts are first positioned on a mold surface mold before an outer layer(s) is/are formed on the mold surface by a spraying process. Only the edges of the plastic inserts need to be spray coated with the material used to form the outer layer(s), thereby greatly reducing the amount of material that has to be trimmed off and discarded.

The present invention can be used to fabricate various interior trim articles, such as instruments panels, dashboards, and/or door panels. The method of spray forming the tear seams according to the present invention allows tear seams to be made in a precise repeatable manner.

FIG. 1 is a perspective view of an instrument panel of a vehicle constructed in accordance with the present invention. The instrument panel 1 depicted in FIG. 1 is configured to conceal and enclose various components such as the instrument cluster, radio, and heating ventilating and air conditioner controls and vent systems. The instrument panel 1 includes a pair of hidden air bag doors 2, with the edges of the hidden doors 2 being generally indicated by reference numeral 3 and having an H-shaped pattern. The edges of the doors are defined by score lines or grooves or perforations or any similar weakened structure formed in the underlying substrate. It is to be understood that the hidden doors 2 can be located at any position in the instrument panel 1 from which an air bag can be deployed and directed to protect occupants of the vehicle. In addition, single or multiple doors can be used in any known pattern such as an H-, I-, C-, U-, or X-shaped pattern.

Figure 2A:
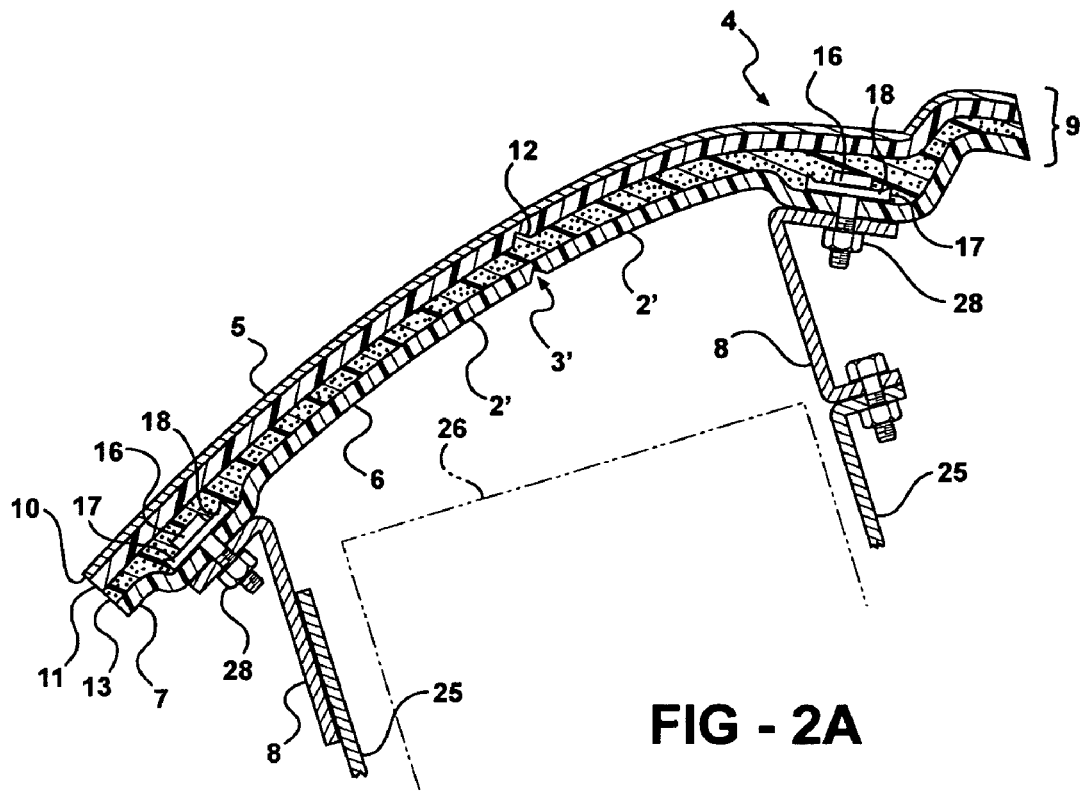
FIG. 2A is a sectional view of the instrument panel of FIG. 1 taken along line II-II.
Figure 3:
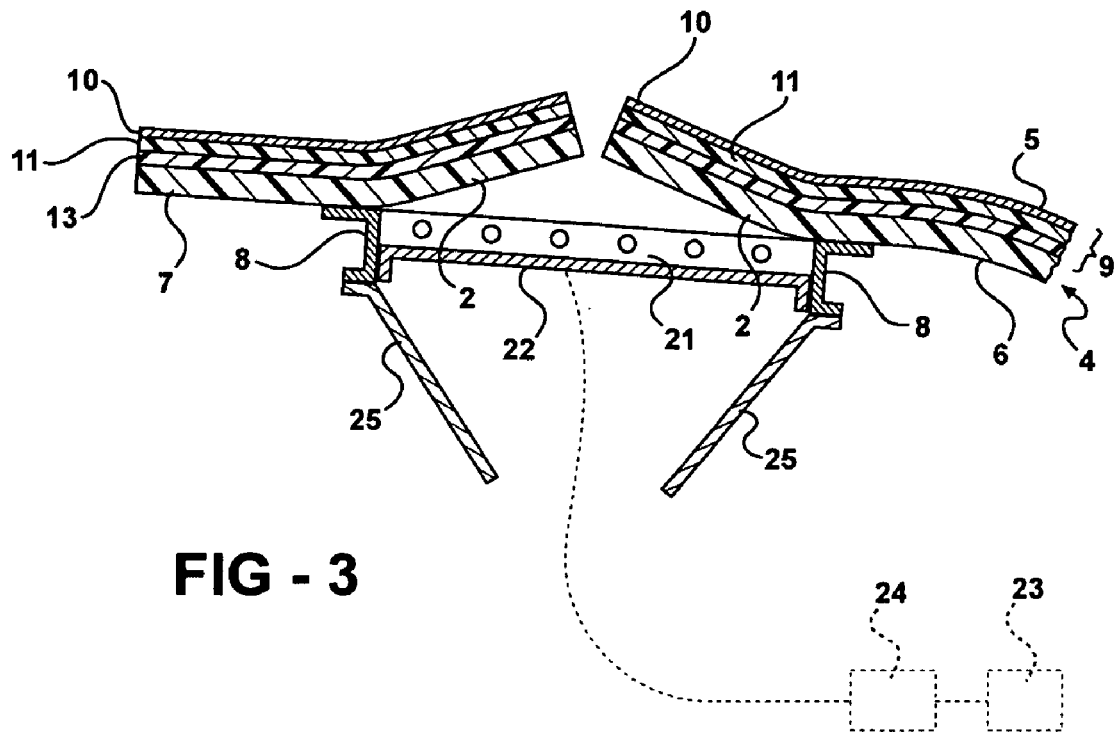
FIG. 3 is a sectional view depicting an air bag in a partially inflated deployment position.
Figure 4:
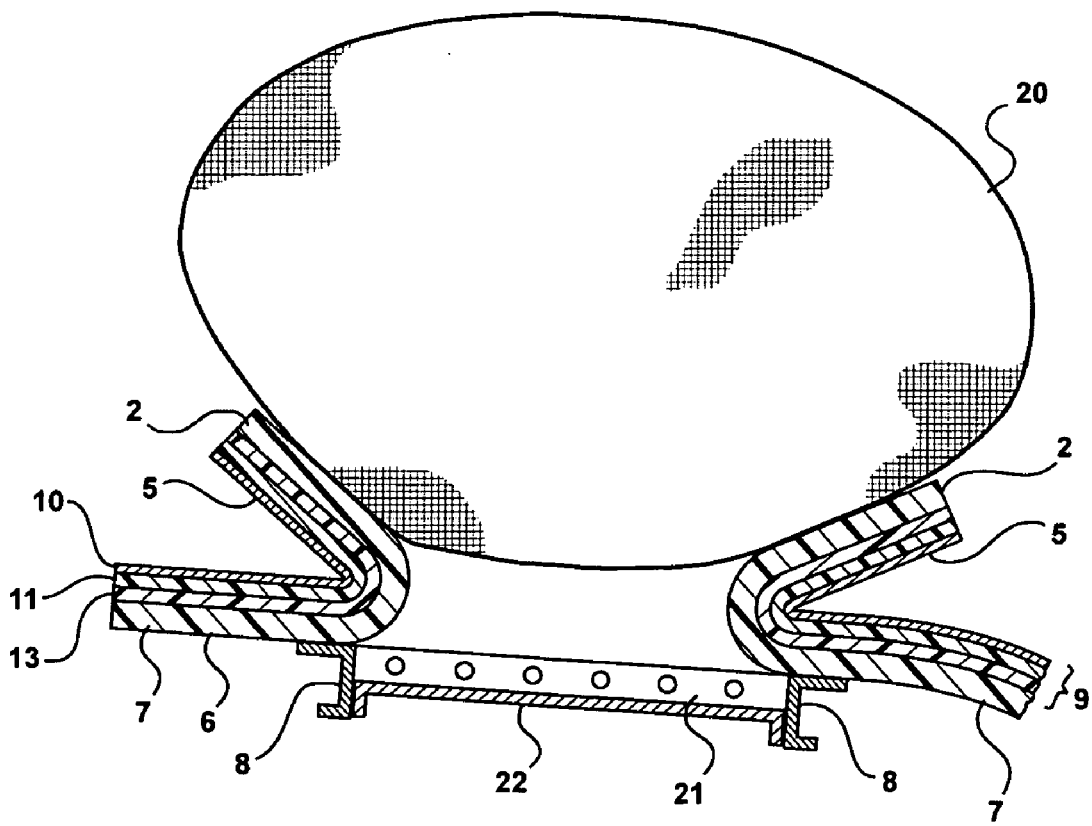
FIG. 4 is a sectional view depicting an air bag in a fully inflated deployment position.

FIG. 2A is a sectional view of the instrument panel of FIG. 1 taken along line II-II. The panel 4 has a multi-layered structure having an exterior surface 5 exposed to the vehicle interior and an interior surface 6 which is hidden from the vehicle interior when the panel 4 is mounted in a vehicle. The multi-layered structure includes a rigid or reinforcing substrate 7 having one surface defining the interior surface 6 of the panel 4. A portion of the substrate 7 defines doors 2. Doors 2 can be formed by cutting or scoring the substrate in a pattern such as an H-, I-, C-, U-, or X-shaped pattern that outlines the shape of the doors 2. The doors 2 are designed to open outwardly into the passenger compartment. In one embodiment that is depicted in FIGS. 3 and 4, the substrate 7 in which the doors 2 are formed is designed merely to bend outwardly adjacent structure that supports the multi-layered structure as an airbag pushes against the doors 2. Alternatively, hinge features such as scored, grooved or otherwise weakened areas could be formed in the substrate 7 along which the doors 2 can pivot or bend. In a further alternative, the pivotal doors 2 can be formed separately from the substrate 7 and attached to the substrate 7 via, for example, hinges or the like as exemplified in FIGS. 2C and 2D. In the illustrated embodiment shown in FIGS. 1 and 2A, when viewed from the backside of the substrate 7, the doors 2 define an H-shaped pattern by score lines 3' which could also be grooves or otherwise weakened portion of substrate 76. As discussed below, the doors 2 can alternatively be define other patterns and can be displaced by other means (other than pivotal movement). The substrate 7 can be made of any suitably rigid material including structural plastics such as polycarbonate and acrylonitrile-butadiene-styrene (PC-ABS) blends, acrylonitrile-butabiene styrene (ABS)/polycarbonate, thermoplastic poly-olefin (TPO), polypropylene, polyphylene oxide (PPO)/high-impact polystyrene (HIPS), styrene malaeic anhydrid (SMA) or polyester-carbonate (PPC).

The multi-layered structure of the panel 4 further includes an outer layer 9 having a first outer layer 10 that defines at least a portion of the exposed exterior surface 5 of the panel structure 4 and a second outer layer 11 in which a tear seam 12 is formed as discussed below. At least a portion of the first outer layer 10 is exposed to the vehicle interior, while a portion of the first outer layer 10 may be hidden from view by a decorative or other masking item.

An intermediate layer 13 comprising relatively rigid or semi-rigid polyurethane cellular foam adhesive is interposed between the outer later 9 and the substrate 7. The tear seam 12 is defined by a channel 14 (See FIG. 10) formed into the second outer layer 11 that has a depth which is substantially equal to the thickness of the second outer layer 11. The tear seam 12 further includes a frangible web 12 (See FIG. 10) at the bottom of channel 14 which is formed by the first outer layer 10 and has a thickness substantially equal to the thickness of the first outer layer 10.

FIG. 2A depicts one manner in which the multi-layered structure of the panel 4 can be mounted in a vehicle. In FIG. 2A metal braces or brackets 8 are coupled at ends thereof to the substrate 7 by mechanical fasteners such as weld bolts 16. The opposite ends of the metal braces or brackets 8 are coupled to supporting or bracing structure 25 under the instrument panel and the gas generator or canister for the air bag. The ends of the braces or brackets 8 that are coupled to substrate 7 are bent to conform to the contour of the instrument panel. Substrate 7 includes recessed areas 17 which are configure to receive narrow metal panels 18 that extend adjacent to the pivotal edge of the door panels 2'. The metal panels 18 include through-holes through which weld bolts 16 pass. Weld bolts 16 pass through the through-holes in metal panels 18 and aligned through-holes in substrate 7 and are secured by nuts 28 and optional washers (not shown). It is noted that the metal braces or brackets 8 can have widths that extend the width of the door panels 2' together with metal panels 18 if desired. The recessed areas 17 are filled with the material from which the intermediate layer 13 is formed so as to ensure that the recessed areas 17 are not visible on the outer surface of the multi-layered structure. In FIG. 2A the general area in which the airbag and inflator system are installed is indicated by phantom lines 26.

Figure 2B:
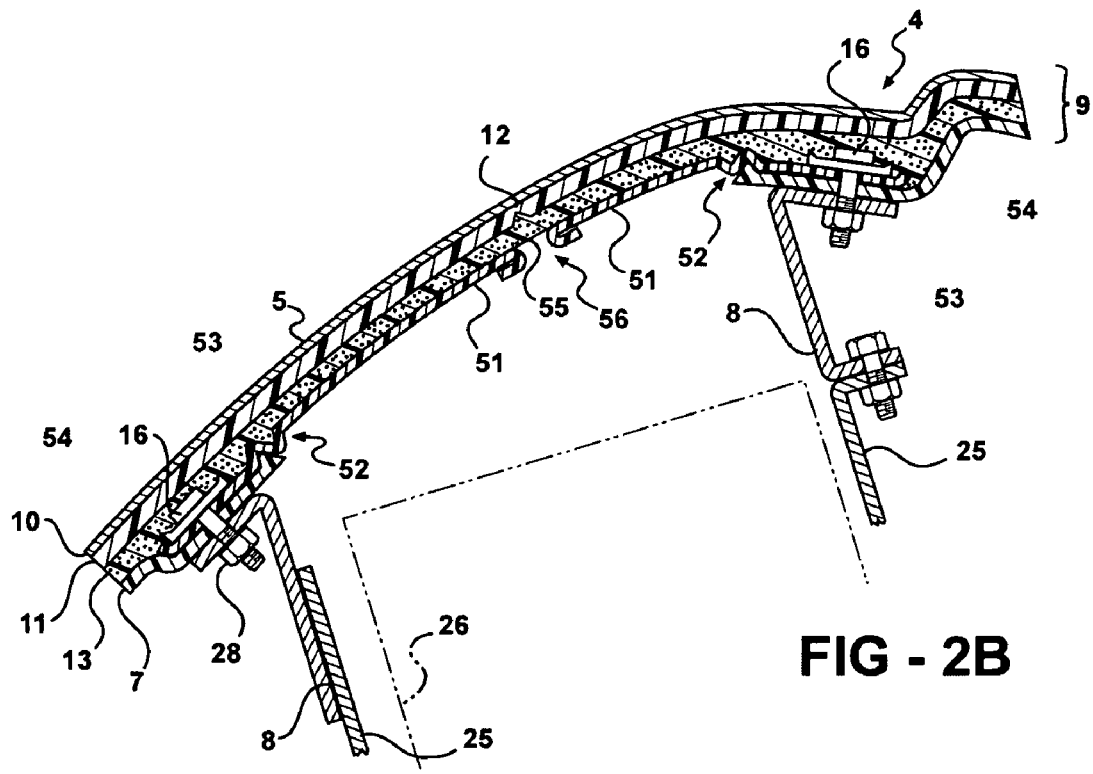
FIG. 2B is a sectional view of an instrument panel similar to that shown in FIG. 2A which includes metal door panels.

FIG. 2B is an alternative embodiment to that shown in FIG. 2A in which the substrate 7 does not include the door panels of FIG. 2A. In FIG. 2B metal panels 51 (e.g. steel panels) are used in place of the door panels 2' in FIG. 2A. Metal panels (or door panels) 51 include reversed bent areas 52 along which the door panels 51 are configured to pivot (as they bend along the reversed bent areas 52) when pushed outward by an airbag. The door panels 51 are secured to the substrate 7 by reinforcing brackets 53 which are similar to the metal panels 18 used in the embodiment depicted in FIG. 2A. Likewise, the substrate 7 has recessed areas 54 that receive door panels 51 and reinforcing brackets 53. Similar mechanical fasteners such as weld bolts 16 are used together with nuts 28 and optional washers (not shown) to secure the door panels 51, substrate 7 and metal braces or brackets 8 together. As shown in FIG. 2B a length of tape 55 can be used to cover and seal the gap 56 between door panels 51 when applying the material from which intermediate layer 13 is formed. The recessed areas 54 are filled with the material from which the intermediate layer 13 is formed so as to ensure that the recessed areas 54 are not visible on the outer surface of the multi-layered structure. In FIG. 2B the general area in which the airbag and inflator system are installed is indicated by phantom lines 26.

The embodiments of the invention depicted in FIGS. 2A and 2B are suitable for use when the substrate is made from a material such as PC-ABS which will bend alone the pivotal edges of the door panels 2' or when the metal door panels 51 are used. When a material such as PPC is used to form the substrate 7 with integral door panels 2', a tether system can be incorporated which will allow the door panels 2' to pivot open without breaking lose or becoming free.

Figure 2C:
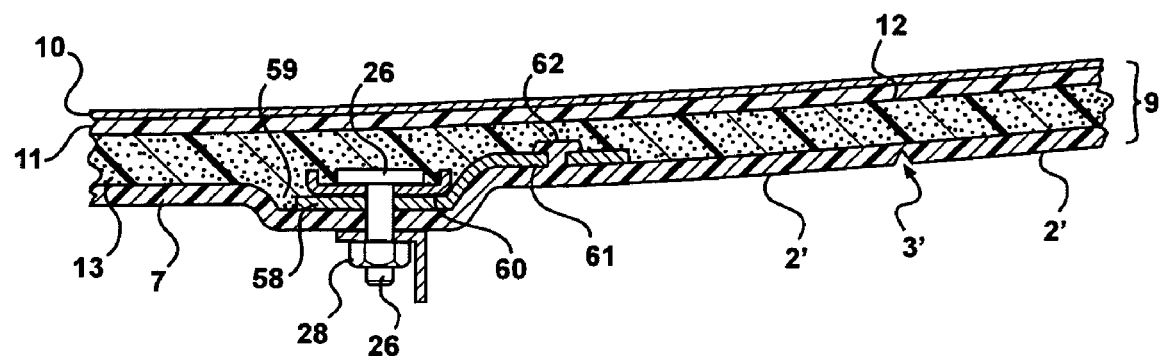
FIG. 2C is a sectional view of an instrument panel that is provided with a tether system that retains the door panels when they open.
Figure 2D:
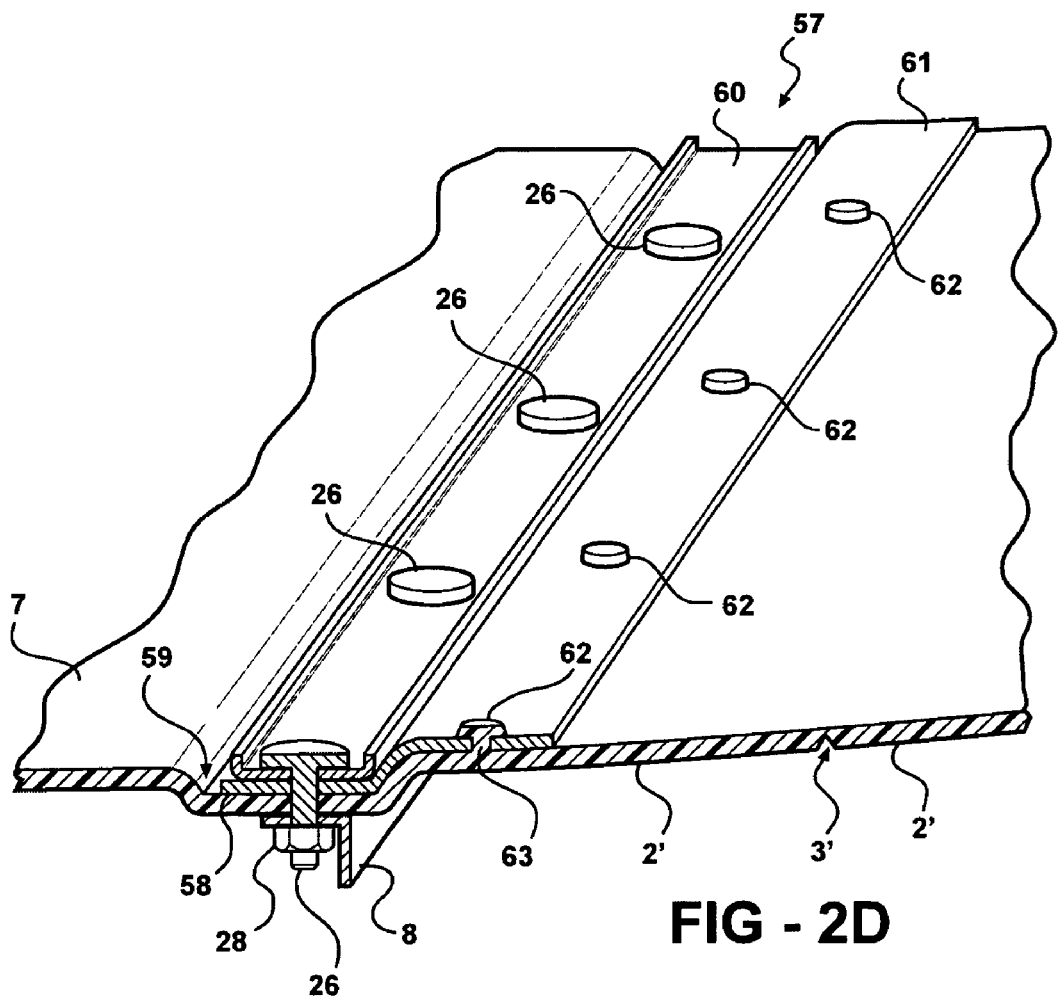
FIG. 2D a perspective view of the instrument panel of FIG. 2C.

FIGS. 2C and 2D depict a tether system which comprises bendable hinge members 57 having base portions 58 that can be coupled to a recessed areas 59 of substrate 7 that are adjacent the pivotal edge of door panels 2'. In FIG. 2D the intermediate layer 13 and outer layer have not been included so as to better illustrate the features of the tether system. Moreover only one door side of the assembly is shown, it being understood that the other door side of the assembly is similar. The base portions 58 of the bendable hinge members 57 can be secured to substrate 7 using reinforcing brackets 60, mechanical fasteners 26, nuts 28 and optional washers (not shown) in an arrangement similar to that depicted in FIG. 2B. The bendable hinge members 57 further include offset portions 61 (offset from the base portions 58) which can be coupled to the outer edges of the door panels 2' by protrusions 62 that are formed on the door panels 2', received in through-holes 63 provided on the offset portions 61 and melt welded therein as depicted. It is to be understood that, as in the case of the reinforcing brackets 53 of FIG. 2B and the metal panels 18 in FIG. 2A, the reinforcing brackets 60 can extend the length or width of the door panels.

In operation of the tether system, the hinge members 57 bend adjacent the junction of the base portions 61 and offset portions 61 as the door panels 2' are pushed open by an airbag. The hinge members otherwise remain intact and prevent the door panels 2' from breaking completely free.

The air bag deployment system that is used in combination with the multi-layered panel structure of the present invention can include any conventional system that is configured to be installed behind a panel-like structure and capable of deploying an air bag at a sufficient rate to protect an occupant of a vehicle. A typical air bag deployment system includes a stationary gas generator or canister situated in a housing that is mounted on a suitable vehicle component. When the vehicle experiences a rapid deceleration as in the case of an impact, an impact sensor actuates the gas generator causing the gas generator to condition a controller to initiate gas generation and expel a suitable inflatant gas into the air bag.

FIG. 3 is a sectional view depicting an air bag in a partially inflated deployment position. FIG. 4 is a sectional view depicting an air bag in a fully inflated deployment position. As shown in FIGS. 3 and 4, as the air bag 20 is inflated from its folded state, the expanding air bag 20 impacts against the backside of the panel structure 4 with a force that displaces doors 2 into the passenger compartment and at the same time ruptures and tears the outer layer 9 along the tear seam 12. The result creates an opening in the panel structure 4 through which air bag 20 continues to fully expand and protects occupants of the vehicle from experiencing serious impact injury that can occur from striking the panel structure 4 or windshield. In FIGS. 3 and 4 reference numeral 21 identifies a stationary gas generator or canister which is mounted on stationary structure 22 coupled to substrate 7 by brackets 8 discussed in reference to FIGS. 2A and 2B which can be supported by bracing structure 25 (FIG. 3). An impact sensor 23 and actuator 24 are depicted in phantom.

Having discussed the general structure of the panel structures of the present invention and how they function during deployment of air bags, a discussion as to how to form the tear seams in the panel structure according to the present invention will now be presented.

Figure 5:
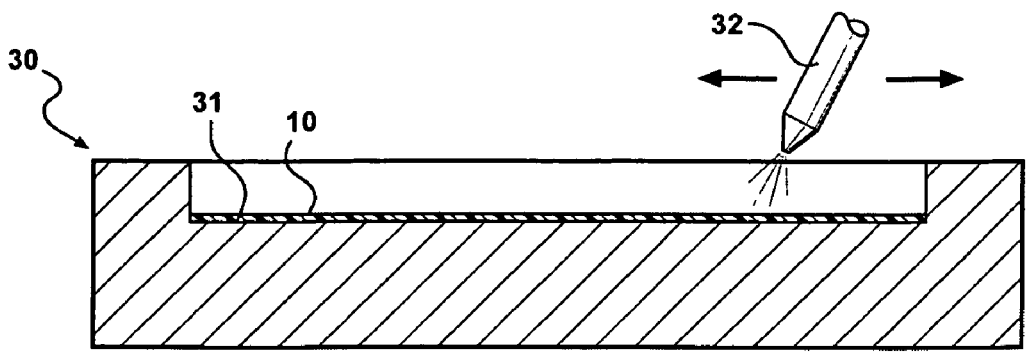
FIG. 5 is a sectional view of a mold surface showing a step of applying a first outer layer of polymeric material to the mold surface.

FIG. 5 is a sectional view of a mold surface showing a step of applying a skin layer of polymeric material to the mold surface. The mold 30 includes a mold surface 31 that is complementary shaped to the desired configuration of the outer layer 9 of the multi-layer panel structure 4. The mold surface 31 further is suitably textured, e.g. grained to provide the resulting outer surface of a fabricated skin with a desired appearance, which, for example, can simulate leather.

The first step in the process involves the formation of first outer layer 10 which is produced by spraying the mold surface 31 with a polymeric material such as a sprayed aromatic or aliphatic urethane skin. The skin is formed from two-components, which, when mixed together, produce a chemical reaction. The mixture is forced through a tube of a spray gun (not shown) and further through a nozzle 32 at the end of the tube to produce various spray patterns. The mold surface 31 is preferably heated so that when the mixture is deposited on the mold surface 31 it solidifies after a brief period of time (e.g., 45 seconds) to form the first outer layer 10. The spray nozzle 32 depicted in FIG. 5 can be moved automatically by a robotic mechanism.

It is also possible to use a curable molten thermoplastic material such as spray urethane to form the first (and second) outer layer 10. One example of a suitable spray urethane material is Elastolute® M50555R Resin/Elastolit® M50555ST Isocyanase Spray Aromatic Urethane System by BASF Corp.

The first outer layer 10 is sprayed on to produce a thickness of from about 0.2 to 1.0 mm, or preferably from about 0.2 to about 0.6 mm. The first outer layer 10 can be either applied to the entire mold surface 31 or only to a portion of the mold surface 31 whereat the tear seams 12 are to be formed. As noted above, if the first outer layer 10 is only applied to a portion of the mold surface 31 it may be necessary to paint the outer surface of the resulting outer layer 9 to conceal any transition or boundary that is visible between first and second outer layers 10 and 11. Painted of the outer surface can be accomplished by providing a paint layer on the mold surface 31 before applying the first outer layer 10 therein. Suitable paints which can be applied, for example by a spraying process, include aromatic urethanes to which desired pigments have been incorporated. The thickness of the paint layer, when used, can be from about 15 µm to about 50 µm.

Figure 6:
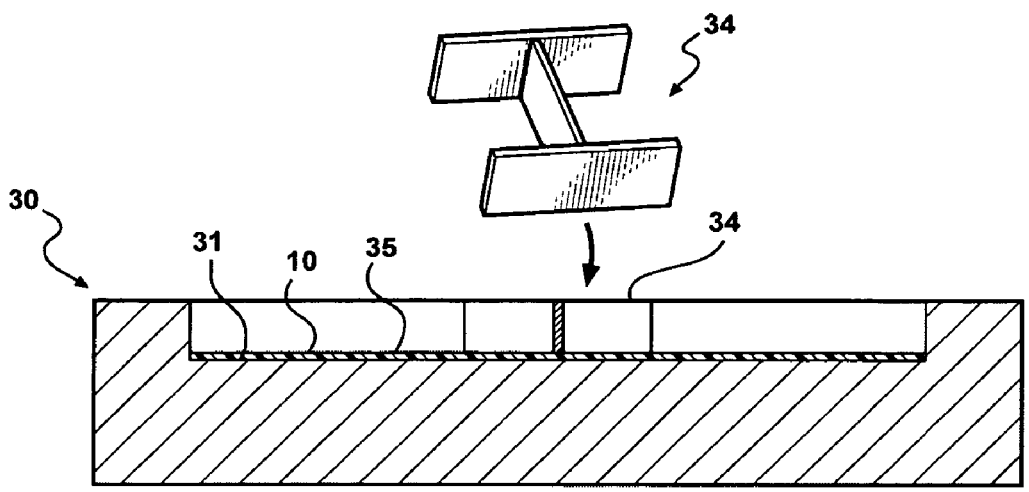
FIG. 6 is a sectional view of the mold of FIG. 5 showing the positioning of a seam jig or mask on the first outer layer of polymeric material.

FIG. 6 is a sectional view of the mold of FIG. 5 showing the positioning of a seam jig or mask on the skin layer of polymeric material. After the first outer layer 10 has been applied and substantially cured or solidified, a seam jig or mask 34 according to the present invention is placed on the exposed surface 35 of the first outer layer 10 in a position so that a tear seam pattern formed by the jig or mask 34 corresponds with at least a portion of an outline of the doors 2 formed in the rigid substrate 7.

Figure 7:
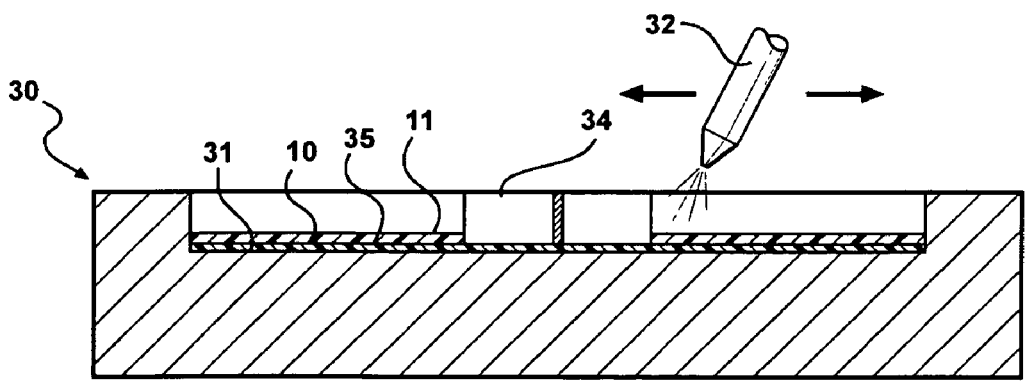
FIG. 7 is a sectional view of the mold of FIG. 5 showing a step of applying a second outer layer of polymeric material onto the first outer layer of polymeric material.

FIG. 7 is a sectional view of the mold of FIG. 5 showing a step of applying a second layer of polymeric material onto the first outer layer of polymeric material. After the jig or mask 34 is properly positioned on the exposed surface 35 of the first outer layer 10, a second outer layer 11 is applied to the first outer layer 10 and any portion of the mold surface 31 which was not originally covered by the first outer layer 10. The second outer layer 11 is also produced by spraying the first outer layer 10 (and any portion of the mold surface 31 which was not originally covered by the first outer layer 10) with a polymeric material such as aromatic urethane or by spraying the first outer layer 10 (and any portion of the mold surface 31 which was not originally covered by the first outer layer 10) with a molten thermoplastic material such as spray urethane. The second outer layer 11 is sprayed on to produce a thickness of from about 0.4 to about 1.5 mm or larger and preferable from about 0.6 to about 1.0 mm.

Figure 8:
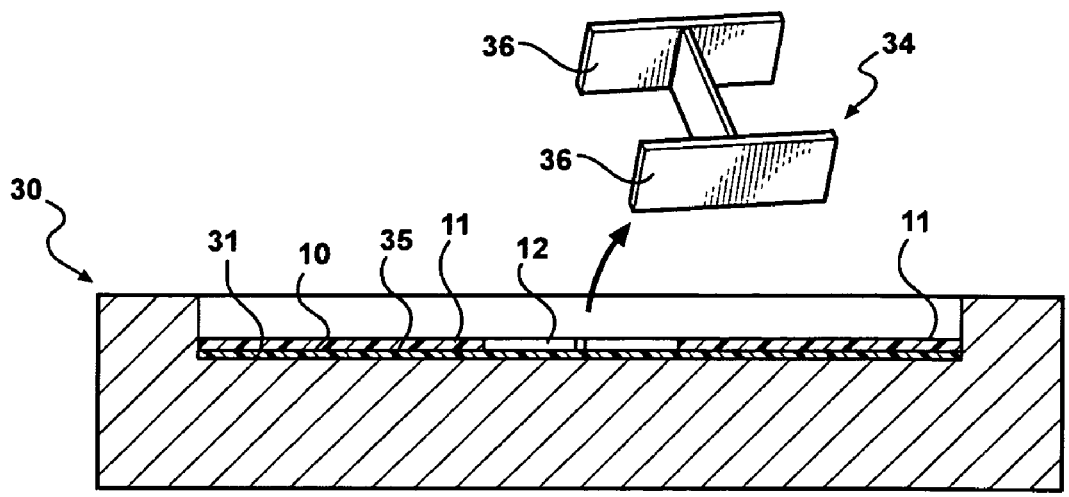
FIG. 8 is a sectional view of the mold of FIG. 5 showing a step of removing the seam jig or mask from the layers of polymeric material.

FIG. 8 is a sectional view of the mold of FIG. 5 showing a step of removing the seam jig or mask from the layers of polymeric material. Removal of the seam jig or mask 34 leaves the foot-print of the seam jig or mask 34 in the second outer layer 11. The panels 36 of the seam jig or mask 34 are relatively thin with a thickness of from about 0.3 to about 1.0 mm and preferably from about 0.3 to about 0.6. This thickness is suitable for producing a tear seam 12 having a width that will rupture and tear when a given pressure is applied thereto, i.e. when underlying doors 2 are impacted by an air bag 20 upon deployment. The foot-print of the jig or mask 34 can define tear seams 12 that have either an H-, I-, C-, U-, X-shape or other desired shape which is complementary to the shape of the jig or mask 34.

As can be appreciated, it is possible to form the tear seams 12 of the present invention using any process to form the first outer layer 10, i.e. not limited to a spray process, and a spray process to form the second outer layer 11, since the combination of the jig or mask 34 together with the spraying process forms the foot-print of the jib or mask 34. However, use of similar spraying processes to form both outer layers may eliminate the need for additional processing equipment and/or techniques.

Figure 9A:
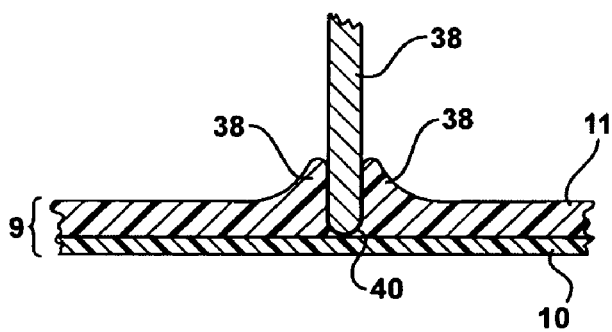
FIG. 9A is a sectional view of the seam jig or mask with the second outer layer of polymeric material built up on the sides.

FIG. 9A is a sectional view of the seam jig or mask with the second layer of polymeric material built-up on the sides. The panels 36 of the jig or mask 34 have cross sections that, as depicted in FIG. 9A end in a curved shape 40. In other embodiments the ends of the panels 36 of the jig or mask 34 can have V-shapes, rectangular shapes, stepped shapes, compound shapes, or any suitable shape that produces a thin frangible web 15 in the underlying first outer layer 10.

The tear seam 12 is defined by a channel 14 (FIG. 10) formed into the second outer layer 11 that has a depth that is substantially equal to the thickness of the second outer layer 11. The tear seam 12 further includes a frangible web 15 at the bottom of channel 14 which is formed or defined by the first outer layer 10 and has a thickness substantially equal to the thickness of the first outer layer 10. This frangible web 15 is configured to rupture and tear when a given pressure is applied thereto, i.e. when underlying doors 2 of the support substrate 7 are impacted by an air bag 20 upon deployment. In an alternative embodiment, a thin portion of the second outer layer 11 can extend under the bottom of channel 14.

Figure 10:
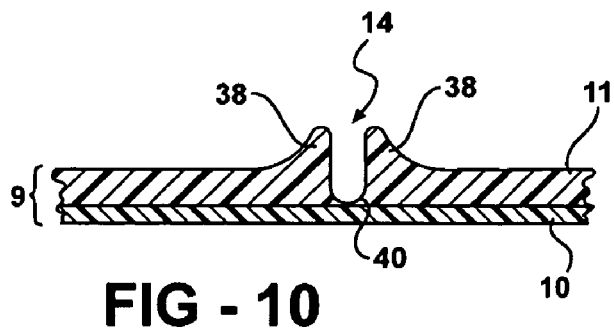
FIG. 10 is a sectional view of a tear seam formed according to the present invention.

The spraying process which is used to apply the second outer layer 11 results in the formation of a built-up (thickness) area 38 on either side of the panels 36 of the jig or mask 34 as shown in FIGS. 9A and 10. The built-up area 38 results from sprayed polymeric material that runs down the sides of the panels 36 or is otherwise deflected downward by the panels 36 of the jig or mask 34. It has been determined during the course of the present invention that having the built-up areas 38 along the edges of the tear seams 12 helps distinguish the weaker portion of the frangible web 15 from the adjacent area of the second outer layer 11 and therefore helps ensure that the tear seams 12 function properly.

Figure 9B:
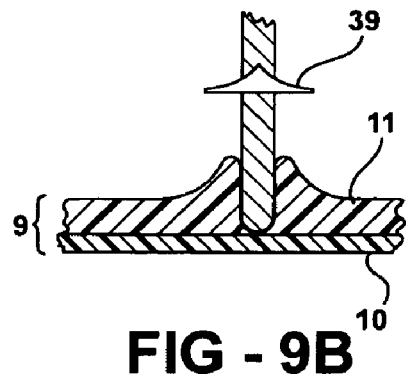
FIG. 9B is a sectional view of the seam jig or mask that is configured to prevent material build-up along the sides of a jig or mask.

FIG. 9B is a sectional view of the seam jig or mask that is configured to prevent material build-up along the sides of a jig or mask. FIG. 9B depicts the use of a shield structure 39 that is provided on either side of the panels 36 of the jig or mask 34. The shield structure 39 is configured to prevent sprayed polymeric material from running down the sides of the panels 36 and forming the built-up area 38 that is depicted in FIGS. 9A and 10. It is to be understood that the exact shape of the shield structure 39 can be varied from that depicted so long as the shape prevents sprayed polymeric material from running down the sides of the panels 36 and forming the built-up area 38 that is depicted in FIGS. 9A and 10.

FIG. 10 is a sectional view of a tear seam formed according to the present invention. In FIG. 10 the bottom 41 of the channel 14 produced from removing the jig or mask 34 from the second outer layer 11 can be seen. The bottom 41 of the channel 14 terminates at the top surface 35 of the first outer layer 10 or the interface between the first outer layer 10 and the second outer layer 11. A frangible web 15 is defined at the bottom 41 of channel 14 by the first outer layer 10. The channel 14 has a depth that is substantially equal to the thickness of the second outer layer 11 and the web 15 has a thickness that is substantially equal to the thickness of the first outer layer 10.

FIG. 10 also depicts the built-up areas 38 along the sides of the tear seams 12 or along the top of channel 14. These built-up areas 38 will have more strength that the remaining portion of the second outer layer 11 and will help in directing or transferring rupturing forces to the weaker frangible web 15.

FIGS. 11A-11E are drawings of different seam jigs or masks that can be used in accordance with the present invention. FIG. 11A depicts a jig or mask 34 that can be used to form tear seams that have an X-shape. The jig or mask 34 in FIG. 11A includes two panel members 36 that intersect at their mid points.

FIG. 11B depicts a C-shaped jig or mask 34 that include a single curved panel member 36.

FIG. 11C depicts a U-shaped jig or mask 34 that include a single curved panel member 36.

FIG. 11D depicts an H-shaped jig or mask 34 that includes a central panel member 36' and two panel members 36 that attached to the ends of the central panel member 36' at their mid points to form an H-shape.

FIG. 11E depicts an I-shaped jig or mask 34 that includes a central panel member 37' and two short panel members 37 that attached to the ends of the central panel member 37' at their mid points to form an I-shape.

The jigs or masks 34 used according to the present invention can be made from stainless steel or any suitable metal, from ceramic materials or other suitably durable materials which can be formed with the thin cross-sectional dimensions noted above. The jigs or masks 34 can be preheated and/or sufficiently heat conductive to reach the temperature to which the mold surface 31 is heated in order to assist in the curing of the second outer layer. A suitable release agent can be applied to the jigs or masks 34 (and to the mold surface 31) so as to limit or prevent the sprayed polymeric materials from sticking thereto. Although not shown, it is to be understood that the jigs or masks 34 can be positioned on the first outer layer 10 using either a mechanically operated positioning means or an automated positioning means. For example, a simple pivotal support could be used to manually position the jigs or masks 34, as could a computer controlled support or robotic arm. The jigs and masks 34 should be positioned in a manner that ensures that a gap between the jigs or masks 34 and the mold surface 31 is maintained which is substantially equal to the thickness of the first outer layer 10, i.e. from about 0.2 to 1.0 mm, or preferably from about 0.2 to about 0.6 mm. This will ensure that jigs or masks 34 are not pressed into the first outer layer 10 and produce a tear seam 12 that is too thin and/or visible from the interior of a vehicle. In an alternative process, rather than use two separate outer layers, a single outer layer could be applied and, before curing, a jig or mask 34 according to the present invention could be pushed into the layer at a depth that maintains the proper gap between the jig or mask 34 and the mold surface 31 i.e. from about 0.2 to 1.0 mm, or preferably from about 0.2 to about 0.6 mm. Similarly, a jig or mask 34 according to the present invention could be pushed into the second outer layer (formed on the first outer layer) or a portion thereof before curing to produce a desired tear seam.

Figure 12:
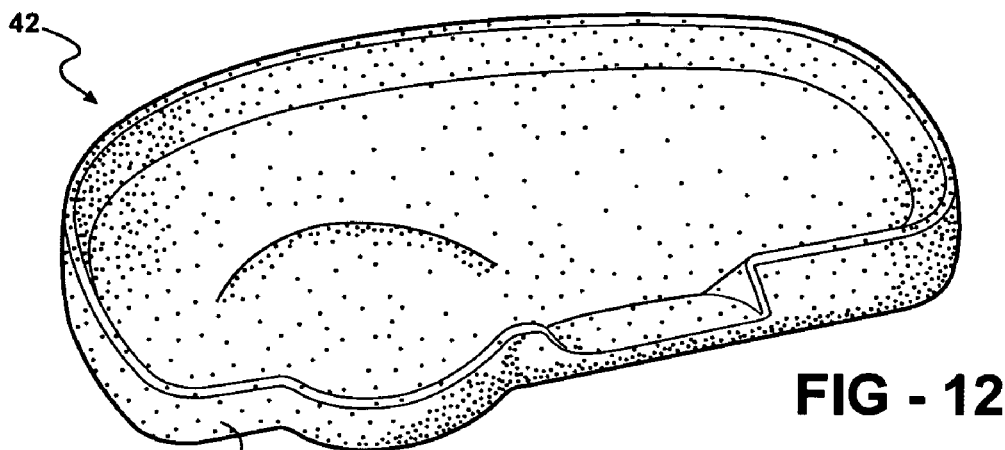
FIG. 12 is a perspective view of an instrument panel skin which has been removed from a mold after being formed by a spraying process.
Figure 13:
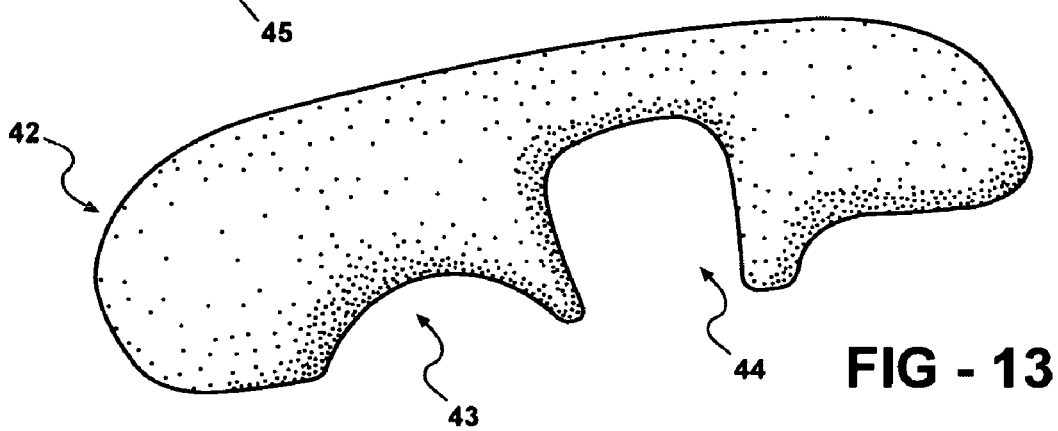
FIG. 13 is a perspective view of the instrument panel skin of FIG. 12 after having been trimmed.

FIG. 12 is a perspective view of an instrument panel skin which has been removed from a mold after being formed by a spraying process. The instrument panel skin 42 depicted in FIG. 12 is made from a spray process and involves spraying a layer of polymeric material such as urethane over the entire surface of a mold. FIG. 13 is a perspective view of the instrument panel skin of FIG. 12 after having been trimmed. In the process of fabricating an instrument panel, after the instrument panel skin 42 is formed on a mold, it is removed and portions 43 and 44 of the skin are trimmed off where, for example, components such as the instrument cluster, radio, and heating ventilating and air conditioner controls and vent systems are to be installed in a vehicle's instrument panel. In addition, the edge 45 of the instrument panel skin 42 is trimmed off. The skin material, i.e. urethane, is relatively expensive and, as can be appreciated, a significant amount or percentage is trimmed off the instrument panel skin that is removed from the mold (and discarded).

Figure 14:
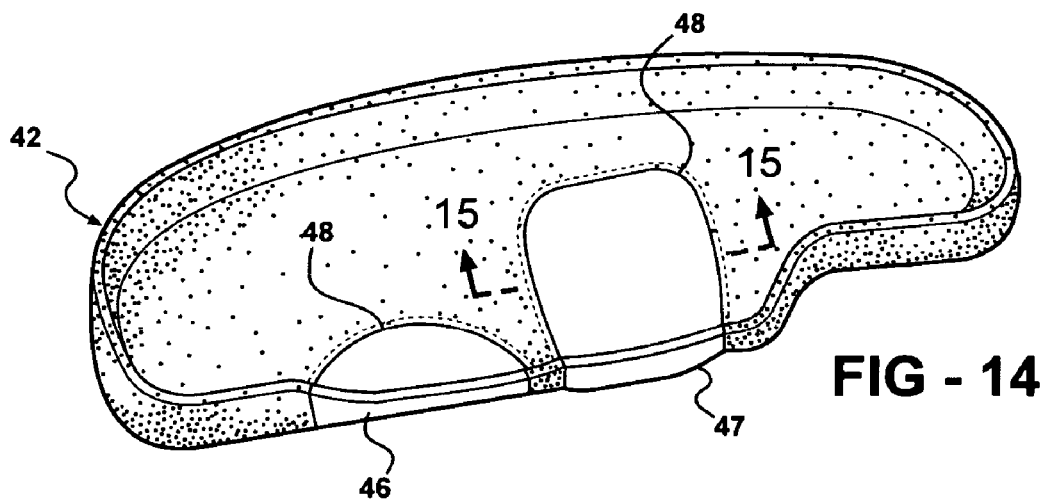
FIG. 14 is a perspective view of an instrument panel skin that is formed by a spraying process with plastic inserts in the mold.

FIG. 14 is a perspective view of an instrument panel that is formed by a spraying process with plastic inserts in the mold. In order to reduce the amount of material that has to be sprayed on the mold surface, inserts 46 and 47 are placed on the mold in positions where the skin would otherwise be trimmed off. For example, inserts could be placed where the instrument cluster, radio, and heating ventilating and air conditioner controls and vent systems are to be installed in a vehicle's instrument panel.

The inserts 46 and 47 conform, i.e. are complementary shaped to the portion of the mold surface over which they are placed. The inserts 46 and 47 can be made from an inexpensive plastic material and formed by an efficient process such as vacuum molding. After use the inserts 46 and 47 can be cut or trimmed out and discarded or recycled. In use, the inserts 46 and 47 are positioned over portions of the mold surface and held in position by any suitable clamping mechanism or by vacuum.

Figure 15:
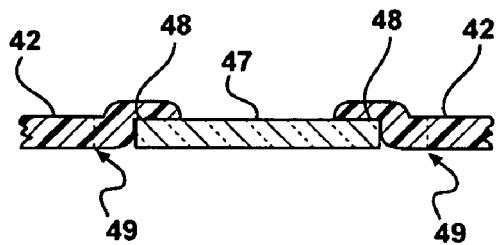
FIG. 15 is a cross-sectional view of FIG. 14 taken along section lines XV-XV.

FIG. 15 is a cross-sectional view of FIG. 14 taken along section lines XV-XV. The polymeric material, e.g. urethane that is sprayed on the mold surface to form the skin layer is sprayed in such a manner that the edges 48 of the plastic inserts 46 and 47 are overlapped as depicted in FIG. 15. These overlapped areas 48 result in the only skin material that has to be discarded after the instrument panel skin is removed from the mold with the plastic inserts 46 and 47. The trimming line 49 along which inserts 46 and 47 are removed from the instrument panel skin 42 is depicted in FIG. 15.

The use of the plastic inserts is not limited to the fabrication of instrument panels. The plastic inserts can be used to form other automobile trim panels that include areas that have to be trimmed out such as door panels that include trimmed out speaker areas.

Although the present invention has been described with reference to particular means, materials and embodiments, from the foregoing description, one skilled in the art can easily ascertain the essential characteristics of the present invention, and various changes and modifications can be made to adapt the various uses and characteristics without departing from the spirit and scope of the present invention as described above and set forth in the attached claims.

What is claimed is:

1. A method of forming an outer layer for a multi-layered trim panel for a vehicle with an invisible tear seam formed in the outer layer which method comprises:
   providing a mold surface that conforms to the shape of a vehicle trim panel;
   applying a first layer of polymeric material to at least a portion of the mold surface;
   providing a jig or mask that is configured in the shape of a desired tear seam pattern;
   positioning the jig or mask onto the first layer of plastic material;
   applying a second layer of polymeric material onto the first layer of plastic material with the jig or mask positioned on the first layer of polymeric material so that the polymeric material applied as the second layer does not overlap an upper portion of the jig or mask; and removing the jig or mask to form a tear seam in the resulting two layered structure.

2. A method of forming an outer layer for a multi-layered trim panel for a vehicle with an invisible tear seam formed in the outer layer according to claim 1, wherein the first and second layers of polymeric material comprise polyurethane which is applied by a spraying process.

3. A method of forming an outer layer for a multi-layered trim panel for a vehicle with an invisible tear seam formed in the outer layer according to claim 2, wherein the first layer is applied to the entire mold surface.

4. A method of forming an outer layer for a multi-layered trim panel for a vehicle with an invisible tear seam formed in the outer layer according to claim 2, wherein the first layer is applied to have a thickness of from about 0.2 mm to about 1.0 mm.

5. A method of forming an outer layer for a multi-layered trim panel for a vehicle with an invisible tear seam formed in the outer layer according to claim 2, wherein the jig or mask is configured in the shape of one of an H, I, X, C or U.

6. A method of forming an outer layer for a multi-layered trim panel for a vehicle with an invisible tear seam formed in the outer layer according to claim 2, wherein the jig or mask is formed from at least one panel member having a thickness of from about 0.3 mm to about 1.0 mm.

7. A method of forming an outer layer for a multi-layered trim panel for a vehicle with an invisible tear seam formed in the outer layer according to claim 2, wherein the tear seam is formed with a built-up edge of the second layer which is thicker than an adjacent portion of the second layer.

8. A method of forming an outer layer for a multi-layered trim panel for a vehicle with an invisible tear seam formed in the outer layer according to claim 1, further comprising positioning at least one shield over a portion of the mold surface and applying at least the second layer of polymeric material to edges of the at least one shield, exclusively from a central portion of the at least one shield.

9. A method of forming a multi-layered trim panel for a vehicle with an invisible tear seam formed in the outer layer which method comprises:

providing a mold surface that conforms to the shape of a vehicle trim panel;

forming a bi-layer of a polymeric material on the mold surface;

providing a support substrate; and attaching the bi-layer of polymeric material to the support substrate using an elastomeric foam, said bi-layer of polymeric material being formed by:

i) applying a first layer of polymeric material to at least a portion of the mold surface by a spraying process;

ii) providing a jig or mask that is configured in the shape of a desired tear seam pattern;

iii) positioning the jig or mask onto the first layer of polymeric material;

iv) applying a second layer of polymeric material onto the first layer of polymeric material by a spraying process with the jig or mask positioned on the first layer of polymeric material so that the polymeric material applied as the second layer does not overlap an upper portion of the jig or mask; and v) removing the jig or mask to form a tear seam in the resulting bi-layer.

10. A method of forming a multi-layered trim panel for a vehicle with an invisible tear seam formed in the outer layer according to claim 9, wherein the first and second layers of polymer material comprise urethane.

11. A method of forming a multi-layered trim panel for a vehicle with an invisible tear seam formed in the outer layer according to claim 10, wherein the first layer is applied to the entire mold surface.

12. A method of forming a multi-layered trim panel for a vehicle with an invisible tear seam formed in the outer layer according to claim 10, wherein the first layer is applied to have a thickness of from about 0.2 mm to about 1.0 mm.

13. A method of forming a multi-layered trim panel for a vehicle with an invisible tear seam formed in the outer layer according to claim 10, wherein the jig or mask is configured in the shape of one of an H, I, X, C or U.

14. A method of forming a multi-layered trim panel for a vehicle with an invisible tear seam formed in the outer layer according to claim 10, wherein the jig or mask is formed from at least one panel member having a thickness of from about 0.3 mm to about 1.0 mm.

15. A method of forming a multi-layered trim panel for a vehicle with an invisible tear seam formed in the outer layer according to claim 10, wherein the tear seam is formed with a built-up edge of the second layer which is thicker than an adjacent portion of the second layer.

16. A method of forming a multi-layered trim panel for a vehicle with an invisible tear seam formed in the outer layer according to claim 9, further comprising positioning at least one shield over a portion of the mold second and applying at least the second layer of polymeric material to edges of the at least one shield, exclusively from a central portion of the at least one shield.

17. A method of forming a multi-layered trim panel for a vehicle with an invisible tear seam formed in the outer layer according to claim 9, further comprising providing the support substrate with at least door structure having an outline which is aligned with the tear seam pattern in the bi-layer.

* * * * *